United States Patent [19]

Daigou et al.

[11] Patent Number: 4,597,642

[45] Date of Patent: Jul. 1, 1986

[54] ARTICULATE JOINT IN LASER PROCESSING MACHINES

[75] Inventors: Yuzuru Daigou, Niigata; Takeo Yagi, Kanagawa, both of Japan

[73] Assignee: Niigata Engineering Co., Ltd., Tokyo, Japan

[21] Appl. No.: 497,306

[22] Filed: May 23, 1983

[30] Foreign Application Priority Data

Dec. 20, 1982 [JP] Japan ................. 57-223401

[51] Int. Cl.[4] ............................. G02B 26/08
[52] U.S. Cl. .................................. 350/486
[58] Field of Search ............... 350/486, 574, 543, 539, 350/500; 372/107; 74/427, 750 R

[56] References Cited

U.S. PATENT DOCUMENTS

| | | | |
|---|---|---|---|
| 2,924,996 | 2/1960 | Brockardt et al. | 74/750 R |
| 3,040,626 | 6/1962 | Griffioen | 350/574 |
| 3,326,619 | 6/1967 | Johnson et al. | 350/500 |
| 3,429,201 | 2/1969 | Zucchellini | 74/427 |
| 3,658,406 | 4/1972 | Karube et al. | 350/574 |
| 4,364,535 | 12/1982 | Itoh et al. | 350/543 X |

FOREIGN PATENT DOCUMENTS

| | | | |
|---|---|---|---|
| 1195227 | 5/1959 | France | 350/301 |
| 1286458 | 8/1972 | United Kingdom | 350/301 |
| 0575951 | 6/1978 | U.S.S.R. | 350/486 |

OTHER PUBLICATIONS

Kalthoff, "Laser-Beam Manipulating Device," IBM Tech. Disclosure Bulletin, vol. 23, No. 5, Oct. 1980.

Primary Examiner—John K. Corbin
Assistant Examiner—Vincent J. Lemmo
Attorney, Agent, or Firm—Sughrue, Mion, Zinn, Macpeak & Seas

[57] ABSTRACT

An articulate joint for use in a laser processing machine includes first and second hollow arms that are interconnected by a hinge so that they are freely bendble in a single plane; a mirror; and a mirror mounting mechanism for mounting the mirror in the hinge so that the mirror is angularly movable in response to relative angular movement between the two arms through an angle which is one-half of an angle of the relative angular movement between the arms, so that a laser beam coming from the first arm can be transmitted into the second arm.

6 Claims, 8 Drawing Figures

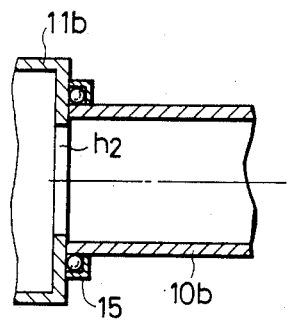
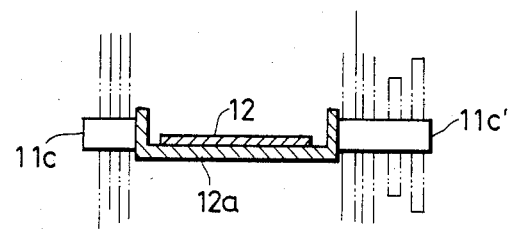
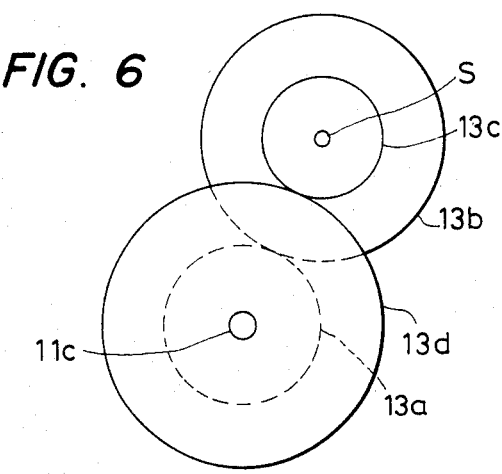
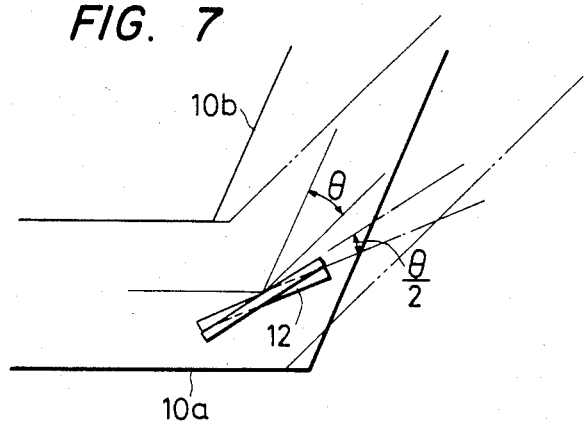

ARTICULATE JOINT IN LASER PROCESSING MACHINES

BACKGROUND OF THE INVENTION

1. Field of the Invention

The present invention relates to an articulate joint to guide a laser beam freely to a desired point in a laser processing machine for use in cutting, welding, heat treating or alloying of metals, plastics and other materials.

2. Description of the Prior Art

FIG. 1 of the accompanying drawings shows a conventional laser processing machine 1 which has articulate joints 2 for freely bending arms 3 to transmit a laser beam to a desired position. As shown in FIGS. 2 and 3, each articulate joint 2 interconnects two hollow arms 3a, 3b mutually bendable in two parallel planes to allow a laser beam to pass through them. One of the arms 3a has a mirror 4a placed in its corner which is coupled to the other arm 3b for reflecting a laser beam from the arm 3a into the arm 3b in the direction of a pivot axis x of the articulate joint 2. The other arm 3b also has a mirror 4b positioned in its corner which is coupled to the arm 3a for reflecting the laser beam as it passes along the pivot axis x to travel in the arm 3b.

The articulate joint 2 in the thus-constructed laser processing machine 1 has a disadvantage because the laser beam is unduly attenuated as it is reflected by the mirrors 4a, 4b.

SUMMARY OF THE INVENTION

According to the present invention, the foregoing problem is eliminated by interconnecting two hollow arms mutually bendable in a single plane with a hinge, and providing a mirror in the hinge. The mirror is angularly movable in response to movement of the arms for transmitting a laser beam in a prescribed direction. Since only one mirror needs to be mounted in a single arm articulate joint, transmission loss of the laser beam is minimized as compared with conventional articulate joints which utilize two mirrors.

BRIEF DESCRIPTION OF THE DRAWINGS

FIG. 2 being a side, elevational view of the articulate joint; and FIG. 3 being a plan view of the articulate joint shown in FIG. 2.

FIGS. 4 through 7 are illustrations of an embodiment of the present invention, FIG. 4 being a cross-sectional view of a central portion of an articulate joint; FIG. 5 being a cross-sectional view taken along line V—V in FIG. 4; FIG. 6 being a schematic view of a planetary gear mechanism; and FIG. 7 being a schematic view illustration of the operation of the articulate joint, FIG. 4a showing a modification of the invention.

DESCRIPTION OF THE PREFERRED EMBODIMENTS

Figure 1:
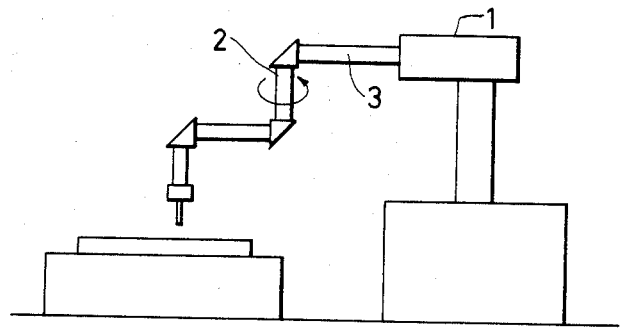
FIGS. 1 through 3 show an articulate joint in a conventional laser processing machine, FIG. 1 being a schematic, side, elevational view of the laser processing machine.
Figure 2:
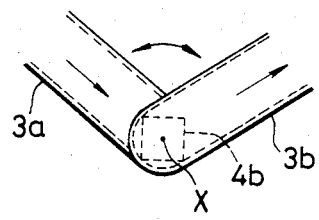
Figure 3:
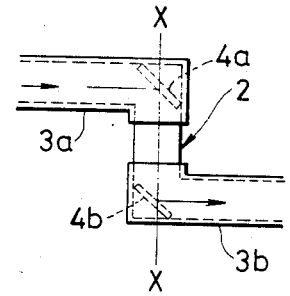
Figure 4:
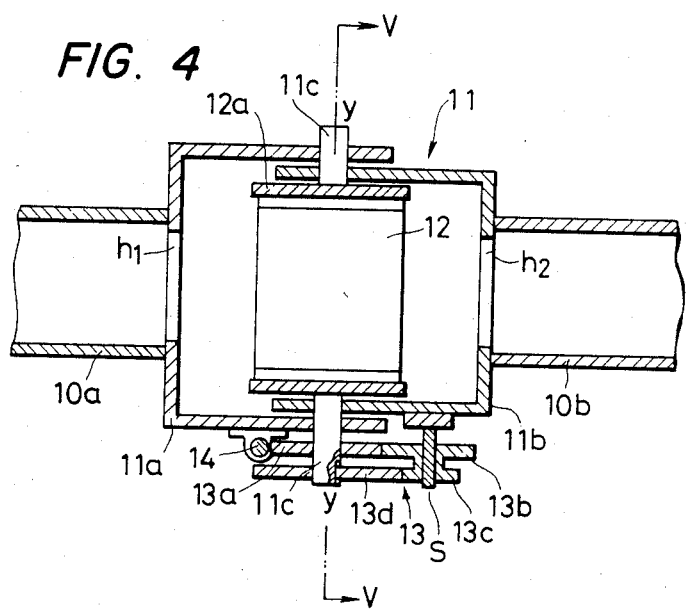

FIGS. 4 through 7 show an embodiment of the present invention. Hollow arms 10a, 10b are joined by a hollow hinge 11 so as to be mutually bendable in a single plane about an axis y—y. The hollow hinge 11 comprises a pair of box-like hinge members 11a, 11b interconnected for relative angular movement by hinge pins 11c, 11c which extend along the axis y—y. The members 11a, 11b contain through-holes $h_1$, $h_2$, respectively, of prescribed sizes in their joint walls and are fixedly joined to the arms 10a, 10b, respectively. The members 11a, 11b have open ends which are located opposite their joint walls. The hollow hinge 11 houses within it a mirror 12 of a given size for reflecting a laser beam, and the mirror 12 is attached to a support plate 12a which is coupled to inner ends of the hinge pins 11c, 11c. The hinge pins 11c have ends which project outward from the members 11a, 11b.

A planetary gear mechanism 13 is connected to the projecting end of one of the hinge pins 11c for angularly moving the mirror 12 in response to relative angular movement of the arms 10a, 10b. The planetary gear mechanism 13 comprises a first gear 13a supported on the hinge pin 11c for relative rotation therewith; a second gear 13b which is rotatably mounted on a shaft S fixed to an outer surface of the hinge member 11b so that it is held in mesh with the first gear 13a; a third gear 13c which is integral with the second gear 13b and rotatably mounted on the fixed shaft S; and a fourth gear 13d which meshes with the third gear 13c and is fixedly mounted on the hinge pin 11c. The first gear 13a is held in mesh with a worm 14 that is rotatably supported on the hinge member 11a. The meshing engagement with the worm 14 secures the first gear 13a to the hinge member 11a. When the arms 10a, 10b are turned relative to each other by an actuator (not shown) such as a hydraulic cylinder connected between the arms, the second gear 13b revolves around the first gear 13a which is in mesh with the second gear 13b. This revolving motion of the second gear 13b is transmitted via the third gear 13c to the fourth gear 13d, which causes the mirror 12 to move angularly. The numbers of teeth of the gears 13a, 13b, 13c, 13d are selected such that the planetary gear mechanism 13 has a speed reduction ratio of $\frac{1}{2}$.

As described above the worm 14 engages the first gear 13a couple that gear to the hinge member 11a and prevent relative rotation. When it is necessary to make an angle adjustment for the mirror 12, the worm 14 is manually turned about its own axis to operate the planetary gear mechanism 13 to achieve the desired angle adjustment. As illustrated in FIG. 5, the mirror 12 has a reflecting surface which lies in line with the axes of the hinge pins 11c.

The articulate joint is operated as follows: FIG. 7 schematically shows the manner in which the arms 10a, 10b and the mirror 12 are angularly moved. The arms 10a, 10b and the mirror 12 are first located in the solid-line position, and a laser beam is transmitted along a central axis of the arm 10a and reflected by the mirror 12 to travel along a central axis of the arm 10b. When the arm 10a is angularly moved through an angle $\theta°$ by the above-described mechanism, the mirror 12 is caused to turn by the planetary gear mechanism 13 through an angle $\theta°/2$, in the same direction as the direction in which the arms 10a, 10b are turned. Therefore, the optical axis of the reflected laser beam is centrally maintained in the arm 10b at all times, and any adjustment of the angle of attachment of the mirror 12 can be made by the worm 14, as described above.

In the foregoing embodiment, the planetary gear mechanism 13 is employed to enable the mirror 12 to follow the relative angular movement of the arms 10a, 10b. Instead of using the planetary gear mechanism, however, the angle $\theta$ of relative angular movement between the arms may be accurately detected, and the detected data may be entered into a servomechanism to enable the servomechanism to turn the hinge pins 11c through $\theta°/2$.

In the foregoing embodiment, the hollow arms 10a, 10b are fixed to the joint walls. However, either hollow arm may be coupled to the associated joint wall so as to be rotatable around the axis thereof. For example, as shown in FIG. 4a, a bearing means 15 is provided between the arm 10b and the member 11b so that the arm 10b may be rotated relative to the member 11b. In this case, the other arm 10a is fixed to the other member 11a in the same manner as in the previous embodiment. Thus, the hinge means may form a universal joint with the above described advantages. In the construction shown in FIG. 4a, the motion of the two arms is not limited to a two-dimensional manner.

In the embodiment shown, the hinge means includes box-shaped members. However, the hinge means is not limited to those particular members shown. It is only necessary to fabricate the hinge means such that the two arms rotate relative to each other. It is also possible to make an open type hinge means but not a box-shaped type hinge means. In this case, the open parts thereof may be covered by flexible members such as bellows.

With the present invention, as described above, two arms are interconnected so that they are mutually bendable in a single plane by a hinge which houses a mirror that is angularly movable in response to angular movement of the arms through an angle that is half the angle through which the arms are turned. A laser beam can be transmitted along the axes of the arms by simply placing a single mirror in each arm's articulate joint. The transmission loss of the laser beam is accordingly reduced as compared with conventional articulate joints which utilize dual mirrors in each articulate joint, and the laser beam can be guided accurately to a desired point. The articulate joint for use in the laser processing machine according to the present invention is therefore simpler in construction and easier to reduce to practice.

We claim:

1. An articulate joint for use in a laser processing machine, comprising:
   a hinge comprising first and second members and hinge pin means interconnecting said first and second members;
   a first and second hollow arms interconnected by said hinge for passage therethrough of a laser beam said first and second hollow arms being freely bendable in a single plane;
   a mirror supported to said hinge pin means; and
   means for mounting said mirror in said hinge so that said mirror is angularly movable in response to relative angular movement of said first and second arms through an angle which is one-half of an angle of a relative angular movement of said first and second arms for reflecting said laser beam coming from said first arm into said second arm, said mounting means comprising a planetary gear mechanism for angularly moving said mirror in response to said relative angular movement of said first and second hollow arms,
   said planetary gear mechanism comprising:
   a first gear supported on an outer surface of said first member and being rotatable relative to said hinge pin means;
   a second gear rotatably mounted on a shaft fixed to an outer surface of said second member, said second gear being in mesh with said first gear;
   a third gear integrally formed with said second gear and rotatably mounted on said fixed shaft;
   a fourth gear in mesh with said third gear, said fourth gear being mounted on said hinge pin means; and
   a worm rotatably supported on said first member, said first gear being in mesh with said worm.

2. The articulate joint as claimed in claim 1, said first and second members comprising box-like members having respective first and second through-holes in respective walls thereof which confront and are jointed to said respective first and second hollow arms, respective opposite ends of said first and second box-like members being open, and said mirror being fixed on a mirror support plate joined in said hinge pin means.

3. The articulate joint as claimed in claim 1, wherein said hinge pin means comprises first and second hinge pins, said mirror having a reflective surface lying in line with axes of said hinge pins.

4. The articulate joint as claimed in claim 1, wherein said meshing engagement between said worm and said first gear secures said first gear to said first member, numbers of teeth on said first through fourth gears being selected such that said planetary gear mechanism has a speed reduction ratio of one-half.

5. The articulate joint as claimed in claim 1, wherein said first and second members are fixedly joined to said first and second hollow arms, respectively.

6. The articulate joint as claimed in claim 1, wherein one of said first and second members is rotatably joined to the associated hollow arm.

* * * * *